US010125684B2

United States Patent
Yu

(10) Patent No.: US 10,125,684 B2
(45) Date of Patent: Nov. 13, 2018

(54) SURFACE COOLER FOR AERO ENGINE

(71) Applicant: PRATT & WHITNEY CANADA CORP., Longueuil (CA)

(72) Inventor: Hong Yu, Oakville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 309 days.

(21) Appl. No.: 14/982,268

(22) Filed: Dec. 29, 2015

(65) Prior Publication Data

US 2017/0184029 A1    Jun. 29, 2017

(51) Int. Cl.
| | |
|---|---|
| F01D 25/14 | (2006.01) |
| F02C 3/04 | (2006.01) |
| F02C 7/06 | (2006.01) |
| F02C 7/14 | (2006.01) |
| F02C 7/18 | (2006.01) |
| F02K 3/06 | (2006.01) |

(52) U.S. Cl.
CPC ............. *F02C 7/14* (2013.01); *F01D 25/14* (2013.01); *F02C 3/04* (2013.01); *F02C 7/06* (2013.01); *F02C 7/18* (2013.01); *F02K 3/06* (2013.01); *F05B 2260/20* (2013.01); *F05B 2260/2241* (2013.01); *F05D 2220/323* (2013.01); *F05D 2260/20* (2013.01); *F05D 2260/201* (2013.01); *F05D 2260/22141* (2013.01)

(58) Field of Classification Search
CPC .. F01D 25/14; F02C 7/14; F02C 7/141; F02C 7/16; F02C 7/18; F02K 3/06; F05D 2260/201; F05D 2260/22141; F05D 2260/20; F05D 2260/211; F05D 2260/221; F05B 2260/20; F05B 2260/211; F05B 2260/221; F05B 2260/2241
See application file for complete search history.

(56) References Cited

U.S. PATENT DOCUMENTS

| | | | |
|---|---|---|---|
| 4,254,618 A | 3/1981 | Elovic | |
| 4,817,756 A * | 4/1989 | Carr | B64D 29/00 181/213 |
| 6,058,696 A | 5/2000 | Nikkanen et al. | |
| 6,931,834 B2 * | 8/2005 | Jones | F28D 15/02 257/E23.088 |
| 7,377,100 B2 | 5/2008 | Bruno et al. | |
| 7,658,060 B2 | 2/2010 | Zysman et al. | |
| 7,862,293 B2 | 1/2011 | Olver | |

(Continued)

FOREIGN PATENT DOCUMENTS

WO    2014197488    12/2014

*Primary Examiner* — Logan Kraft
*Assistant Examiner* — Christopher R Legendre
(74) *Attorney, Agent, or Firm* — Norton Rose Fulbright Canada LLP

(57) ABSTRACT

A gas turbine engine has a surface cooler having a cooler member defining a fluid passage and at least partially contained in an airfoil shaped flow guide member. The cooler member is disposed within a bypass duct and supported on one of the duct walls. The flow guide member provides a smooth outer surface to guide a main portion of a bypass air stream passing over the surface cooler, and defines an inner air channel between the flow guide member and that supporting one of the duct walls for a secondary portion of the bypass air stream to pass through the inner air channel.

16 Claims, 2 Drawing Sheets

(56) References Cited

U.S. PATENT DOCUMENTS

| | | |
|---|---|---|
| 8,235,657 B2 * | 8/2012 | Bulin .................... F01D 9/065 |
| | | 415/176 |
| 8,387,362 B2 | 3/2013 | Storage et al. |
| 8,516,791 B2 | 8/2013 | Perveiler et al. |
| 8,601,791 B2 | 12/2013 | Bajusz et al. |
| 8,763,363 B2 * | 7/2014 | Ranganathan ........ F01D 25/125 |
| | | 165/121 |
| 8,967,958 B2 * | 3/2015 | Bajusz .................... F02C 7/14 |
| | | 415/178 |
| 9,260,191 B2 | 2/2016 | Pollard et al. |
| 9,599,410 B2 | 3/2017 | Antel et al. |
| 9,677,474 B2 | 6/2017 | Hundley, Jr. et al. |
| 9,733,026 B2 | 8/2017 | Stieger |
| 9,765,694 B2 | 9/2017 | Storage et al. |
| 9,903,274 B2 | 2/2018 | Diaz et al. |
| 9,981,751 B2 | 5/2018 | Fert et al. |
| 2013/0048259 A1 | 2/2013 | Stieger |
| 2014/0027102 A1 | 1/2014 | Antel et al. |
| 2014/0044525 A1 | 2/2014 | Storage et al. |
| 2014/0202158 A1 | 7/2014 | Storage et al. |
| 2014/0209286 A1 | 7/2014 | Freund et al. |
| 2014/0271116 A1 | 9/2014 | Snyder et al. |
| 2015/0135726 A1 | 5/2015 | Hundley et al. |
| 2016/0115864 A1 | 4/2016 | Campbell et al. |
| 2016/0131432 A1 | 5/2016 | Neumann et al. |
| 2017/0159491 A1 | 6/2017 | Hoefler et al. |
| 2017/0184024 A1 | 6/2017 | Sennoun |
| 2017/0184028 A1 | 6/2017 | Sennoun |
| 2017/0184029 A1 * | 6/2017 | Yu ............................ F02C 7/14 |
| 2017/0211478 A1 | 7/2017 | Storage et al. |
| 2018/0058472 A1 | 3/2018 | Tajiri et al. |
| 2018/0058473 A1 | 3/2018 | Kenworthy et al. |
| 2018/0094583 A1 | 4/2018 | Carretero Benignos et al. |
| 2018/0171871 A1 | 6/2018 | Duong et al. |

\* cited by examiner

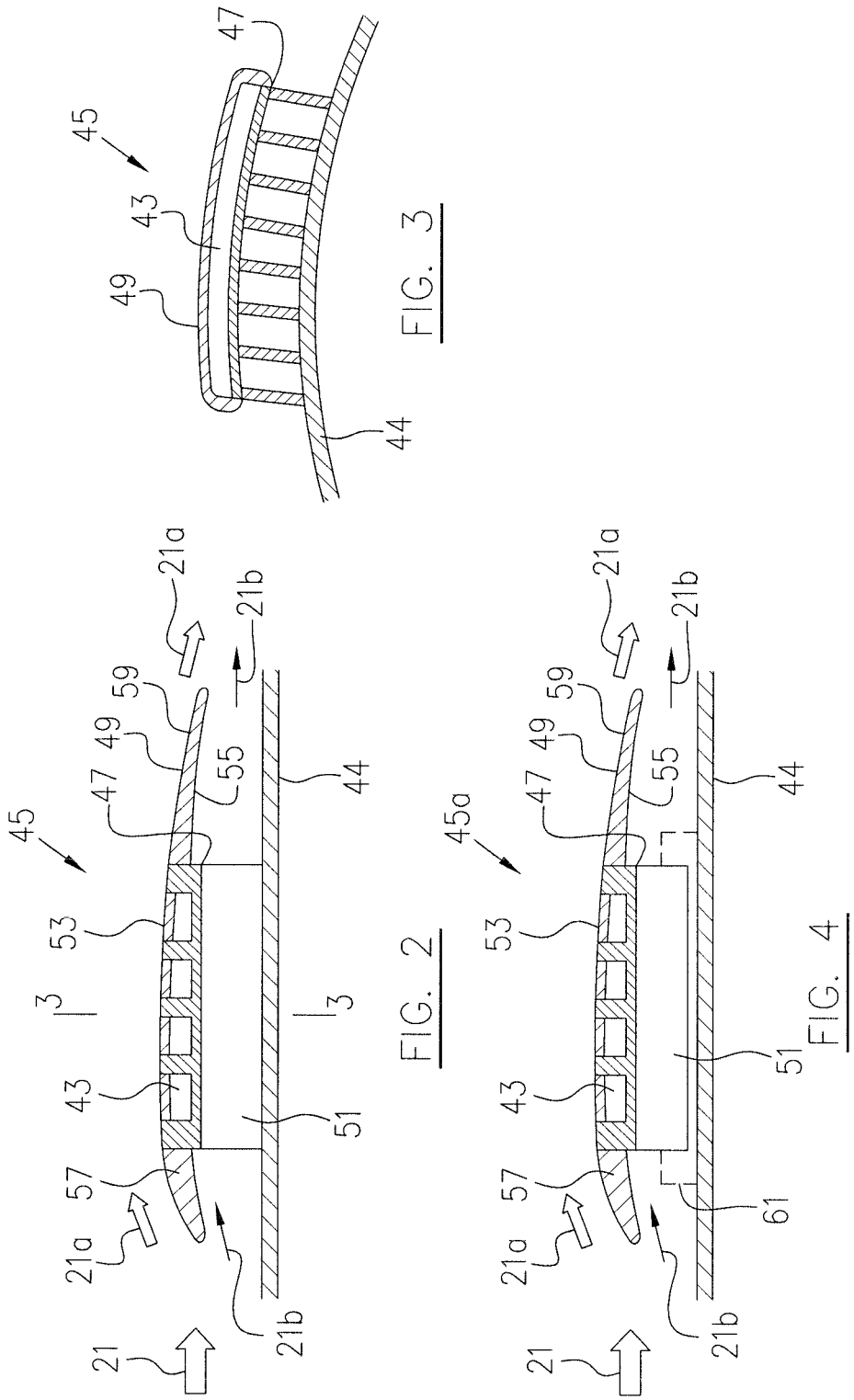

SURFACE COOLER FOR AERO ENGINE

TECHNICAL FIELD

The application relates generally to gas turbine engines and, more particularly, to a cooling apparatus for cooling fluid used in such engines.

BACKGROUND OF THE ART

Air and oil coolers are required in an aero engine to dissipate heat from air and/or oil systems of the engine such that hot fluid flowing through the cooler is cooled by a bypass air stream passing through a bypass section. The coolers are often located in the bypass section of a turbofan engine. A surface cooler which has relatively smaller dimensions in height may define some embedded channels which for carrying hot fluid to be cooled, such as described in Applicant's U.S. Pat. No. 7,377,100. In order to improve a cooler's performance, the contact area of the cooler with the bypass air stream may be increased by having cooler components such as fins projecting into the bypass duct. However, because air in the bypass duct can flow at speeds approaching 0.5 MACH, pressure losses due to the protruding fins or other components of the cooler are considerable. It is desirable to reduce the total pressure loss caused by the protruding fins or other components of the cooler disposed within the bypass duct and at the same time to maintain the cooler's heat transfer performance.

Therefore, there is a need to provide an improved cooler in a turbofan engine.

SUMMARY

In one aspect, there is provided a gas turbine engine having a surface cooler disposed within an annular bypass duct and supported on one of outer and inner walls of the annular bypass duct, the surface cooler comprising: a cooler member defining a fluid passage for a fluid flow to pass therethrough, an airfoil shaped flow guide member including a leading edge and a trailing edge with respect to an air stream passing axially through the annular bypass duct, the cooler member being at least partially contained in the airfoil shaped flow guide member, and a support device supporting the airfoil shaped flow guide member with the cooler member on and spaced apart from said one of the outer and inner walls of the annular bypass duct.

In another aspect, there is provided a gas turbine engine comprising an annular bypass duct defined radially between an outer wall and an inner wall around a core engine, and a surface cooler disposed within the bypass duct and supported on one of the outer and inner walls, the surface cooler including a cooler member defining a fluid passage for a fluid flow to pass therethrough, a plurality of heat transfer members spaced apart one from another and radially projecting from the cooler member, and an airfoil shaped flow guide member having a leading edge and a trailing edge with respect to an air stream axially passing through the bypass duct, the cooler member being directly connected to the airfoil shaped flow guide member, the heat transfer members being located radially between the airfoil shaped flow guide member and said one of the outer and inner walls.

In further aspect, there is provided a method of making a surface cooler disposed within an annular bypass duct of a gas turbine engine, the method comprising steps: a) providing an airfoil shaped flow guide member having opposed sides extending between a leading edge and a trailing edge of the airfoil shaped flow guide member; b) forming a fluid passage at least partially embedded from one of the opposed sides into the airfoil shaped flow guide member; c) providing a plurality of heat transfer members to the airfoil shaped flow guide member, projecting from said one side of the airfoil shaped flow guide member; and d) installing the surface cooler in the annular bypass duct by securing the plurality of heat transfer members to one of inner and outer walls of the annular bypass duct such that the airfoil shaped flow guide member is disposed adjacent and spaced apart from said one of the inner and outer walls of the annular bypass duct.

DESCRIPTION OF THE DRAWINGS

Reference is now made to the accompanying figures in which:

FIG. 2 is a schematic illustration of an axial cross-sectional view of a surface cooler supported on an inner wall of an annular bypass duct of the engine of FIG. 1, according to one embodiment;

FIG. 3 is a schematic illustration of a radial cross-sectional view taken along line 3-3 of the surface cooler in FIG. 2; and FIG. 4 is a schematic illustration of an axial cross-sectional view of a surface cooler supported on an inner wall of the annular bypass duct of the engine in FIG. 1, according to another embodiment.

It will be noted that throughout the appended drawings, like features are identified by like reference numerals.

DETAILED DESCRIPTION

Figure 1:
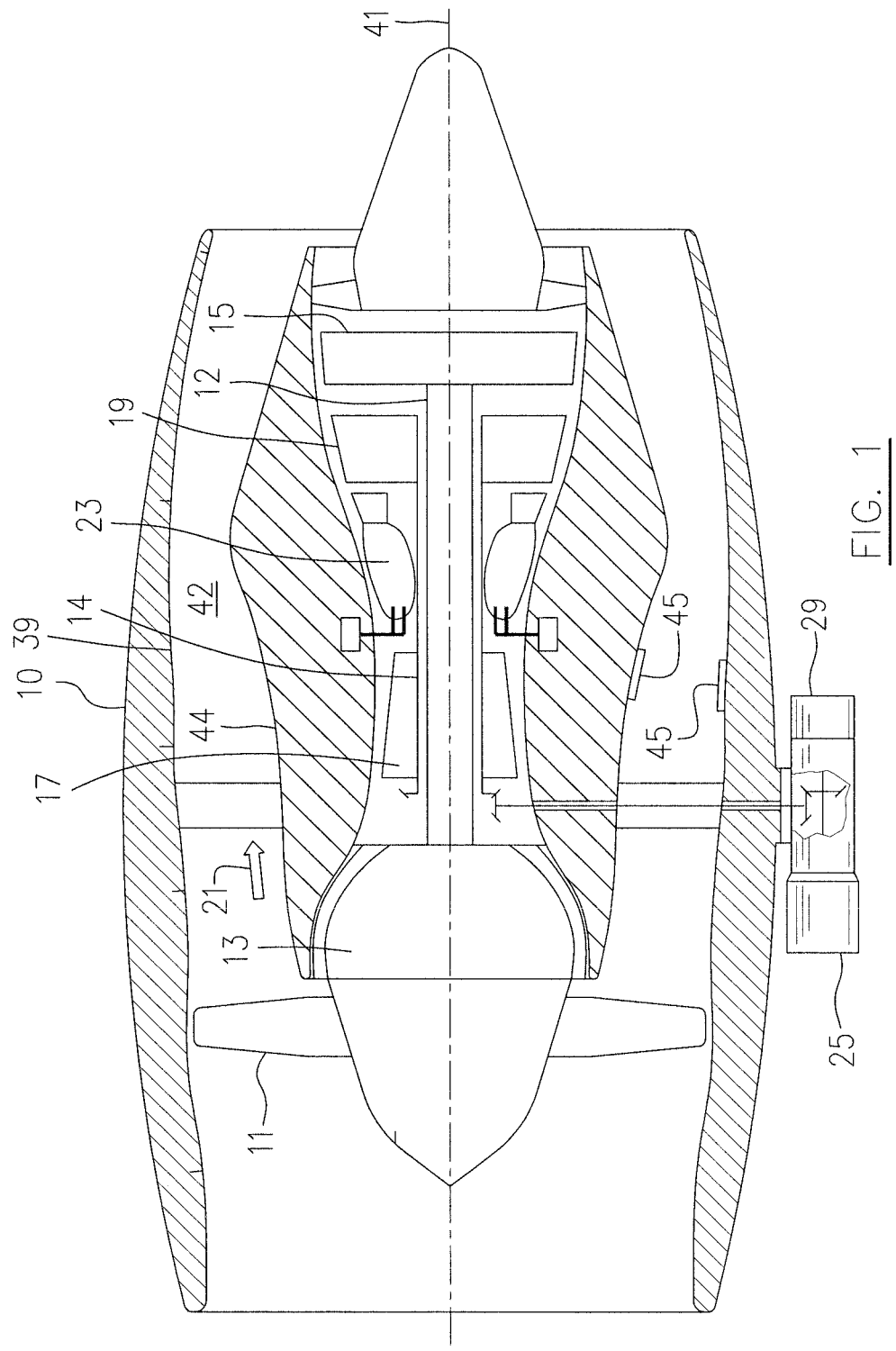
FIG. 1 is a schematic side cross-sectional view of a gas turbine engine as an example illustrating application of the described subject matter.

A bypass gas turbine engine seen general in FIG. 1 includes a housing nacelle 10, a low-pressure spool assembly seen generally at 12 which includes a fan 11, a low-pressure compressor 13 and a low-pressure turbine 15, a high-pressure spool assembly seen generally at 14 which includes a high-pressure compressor 17, a high-pressure turbine 19, a combustor 23 and an accessory-drive assembly 25. An annular bypass duct 42 is defined between an inner bypass duct wall 44 and an outer bypass duct wall 39. A stream of bypass air shown by arrow 21 which is compressed by the fan 11, is directed through the annular bypass duct 42 and discharged therefrom to produce thrust. The engine has a lubricating system (not indicated) including a pump 29 and a surface cooler 45 supported on one of the outer and inner bypass duct walls, 39, 44 (the surface cooler 45 as shown in FIG. 1 is on the inner bypass duct wall 44 according to one embodiment). The surface cooler 45 is connected in fluid communication with the lubricating system of the engine to allow relatively hot fluid such as hot oil to flow therethrough and to be thereby cooled by the fast moving stream of bypass air passing through the annular bypass duct 42.

It is noted that the term "axial", "radial" and "circumferential" used throughout the description and appended claims are defined with respect to the engine axis 41. The term "upstream" and "downstream" are defined with respect to the stream of bypass air as shown by arrow 21.

Referring to FIGS. 1-3, the surface cooler 45 according to one embodiment may be disposed within the annular bypass duct 42 and supported on the outer bypass duct wall 39 or on the inner bypass duct wall 44, (the latter is illustrated in the drawings for convenience of description). The surface cooler 45 may include a cooler member 47, an airfoil shaped flow guide member 49 and a plurality of fins 51 or heat transfer members. The cooler member 47 may directly join or may be at least partially contained in the airfoil shaped flow guide member 49, and may define a fluid passage 43 in fluid communication with the lubricating system of the engine for a fluid flow such as hot oil driven by the pump 29 to pass through the surface cooler 45 and to be cooled by the bypass airstream 21. Alternatively, the fluid passage 43 may be defined in a combined configuration of the cooler member 47 and the airfoil shaped flow guide member 49 as illustrated in FIGS. 2 and 3 such that the fluid passage 43 may be partially or fully embedded in the airfoil shaped flow guide member 49.

Various fluid passage configurations of the surface cooler 45 may be used. For example, the cooler member 47 may include a plurality of tubes connected in a serpentine pattern and installed in the airfoil shaped flow guide member 49 or attached to a surface of the airfoil shaped flow guide member 49 for example by welding or soldering. In another exemplary configuration, the airfoil shaped flow guide member 49 may be made of a metal plate or sheet metal and the cooler member 47 may be a piece of metal plate or sheet metal with a depressed portion formed as a labyrinthine fluid passageway or as a serpentine or tortuous passageway. Such a metal plate or sheet metal cooler member 47 with the depressed portion may be attached to the metal plate or sheet metal of the airfoil shaped flow guide member 49 such that the depressed portion defines the required fluid passage 43 having the desired labyrinthine or serpentine or tortuous configuration between the airfoil shaped flow guide member 49 and the cooler member 47, which is described in detail in the Applicant's U.S. Pat. No. 7,377,100 and incorporated by reference herein.

The airfoil shaped flow guide member 49 may be configured in an airfoil like cooler shape including a leading edge, a trailing edge and an outer surface 53 extending axially between the leading edge and the trailing edge. The outer surface 53 may be smooth and streamlined such as in a convex profile. The airfoil shaped flow guide member 49 may also have an inner surface 55. The cooler member 47 may be attached to the inner surface 55 or may be embedded in the airfoil shaped flow guide member 49 through the inner surface 55 as illustrated in FIG. 2.

The plurality of fins 51 or heat transfer members may be circumferentially spaced apart one from another and may radially extend between the airfoil shaped flow guide member 49 and one of the outer and inner bypass duct walls 39, 44 which supports the surface cooler 45 (supported on the inner bypass duct wall 44 in this embodiment as illustrated in FIGS. 2 and 3). Therefore, the airfoil shaped flow guide member 49 may be disposed substantially parallel to said one of the outer and inner bypass duct walls. For example the fins or heat transfer members may each be connected at one radial end directly to the cooler member 47 by for example welding or soldering and may each be connected at the other radial end to the inner bypass duct wall 44 by the same welding or soldering process. Alternatively, the fins 51 or heat transfer members may be connected directly to the inner surface 55 of the airfoil shaped flow guide member 49 if the cooler member 47 is fully embedded within the airfoil shaped flow guide member 49. Alternatively, the fins 51 or heat transfer members may be connected directly to both the airfoil shaped flow guide member 49 and the cooler member 47. From FIGS. 2 and 3, it can be appreciated that the fins 51 also act as a support device for supporting the cooler member 47 and the airfoil shape flow guide member 49 in spaced relation to the wall of the bypass duct to which the surface cooler is mounted (wall 44 according to the illustrated example).

The airfoil shaped flow guide member 49 may have a leading edge section 57 located upstream of the fins 51 or heat transfer members. The inner surface 55 of the airfoil shaped flow guide member 49 at the leading edge section 57 may be configured for example in a concave profile in an axial cross-section thereof, to diffuse a secondary portion 21b of the bypass airstream 21 to pass between the spaced apart fins 51 or heat transfer members and through the surface cooler 45. The smooth and convex outer surface 53 of the airfoil shaped flow guide member 49 provides a smooth guidance for a main portion 21a of the bypass airstream 21 to pass over the surface cooler 45 with a reduced pressure drop of the flow. The diffused secondary portion of the bypass airstream 21 has a reduced velocity which results in an increased heat transfer rate with the fins or heat transfer members while passing between the spaced apart fins 51 or heat transfer members.

The airfoil shaped flow guide member 49 may have a trailing edge section 59 located downstream of the fins 51 or heat transfer members to control mixing of the main portion 21a of the bypass airstream 21 flowing over the surface cooler 45 with the secondary portion 21b of the bypass airstream 21 exiting from an air channel formed between the airfoil shaped flow guide member 49 and the inner bypass duct wall 44.

Referring to FIG. 4, a surface cooler 45a according to another embodiment is similar to the surface cooler 45 illustrated in FIGS. 2 and 3. The similar components and functions are indicated by like numerals and will not be redundantly described. The surface cooler 45a differs from the surface cooler 45 in that unlike the surface cooler 45 which is directly connected to one of the outer and inner bypass duct walls 39, 44 (inner bypass wall 44 illustrated in FIGS. 2 and 3), with the fins 51 or heat transfer members directly attached to the same, the surface cooler 45a is supported on one of the outer and inner bypass duct walls 39, 44 (the inner bypass duct wall 44 is shown in FIG. 4 for the convenience of description) not directly but for example by braces or brackets 61 or by other support components, such that the fins 51 or heat transfer members are spaced apart from that one of the outer and inner bypass duct walls 39, 44 (the inner bypass duct wall 44 is shown in FIG. 4) to which the surface cooler 45a is attached. In this embodiment, the secondary portion 21b of the bypass airstream 21 which enters the air channel between the airfoil shaped flow guide member 49 and the inner bypass duct wall 44 and which is diffused by the inner surface 55 at the leading edge section 57 of the airfoil shaped flow guide member 49, flows through the air channel via spaces between the spaced apart fins 51 or heat transfer members and also via spaces between the inner bypass duct wall 44 and the fins 51 or heat transfer members.

It should be understood that various configurations of a cooling matrix which is directly connected to or forms part of the cooler member 47, may replace the fins 51 or other heat transfer members. The cooling matrix allows the secondary portion 21b of the bypass airstream 21 to flow therethrough and thus to improve heat transfer performance of the surface cooler 45.

It should also be understood that in the embodiments of FIGS. 2-4, the fins 51, or heat transfer members (or a cooling matrix) directly or indirectly support the surface cooler 45 in the annular bypass duct 42. Nevertheless, in an alternative embodiment, the surface cooler 45 may be supported by a support device which may include or may not include fins, or other heat transfers or a cooling matrix. For example, the airfoil shaped flow guide member 49 with the attached cooler member 47 may be supported directly by support members such as braces or brackets on a wall of the annular bypass duct.

The surface cooler according to the described embodiments advantageously provides a smooth and streamlined cooler outer surface which guides the main stream of the bypass air flow over the surface cooler and thus the pressure loss is reduced in contrast to a surface cooler without such an airfoil shaped flow guide member. The surface cooler of the described embodiments also advantageously provides an inner airflow channel such that a secondary portion of the bypass airstream entering such a channel is diffused to a lower velocity which is optimum for heat transfer while causing lower drag. Therefore, the surface cooler of the described embodiments reduces the total air pressure loss due to the coolers being in the bypass air duct and maintains or even improves the efficiency of the coolers. Furthermore, the lower total pressure loss in the bypass air duct will reduce fuel burn of such aero engines.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A gas turbine engine having a surface cooler disposed within an annular bypass duct and supported on one of outer and inner walls of the annular bypass duct, the surface cooler comprising: a cooler member defining a fluid passage for a fluid flow to pass therethrough, an airfoil shaped flow guide member including a leading edge and a trailing edge with respect to an air stream passing axially through the annular bypass duct, the cooler member being at least partially contained in the airfoil shaped flow guide member, and a support device supporting the airfoil shaped flow guide member and the cooler member in spaced relation to said one of the outer and inner walls of the annular bypass duct.

2. The gas turbine engine as defined in claim 1 wherein the support device comprises a plurality of heat transfer members connected to and extending from the cooler member or the airfoil shaped flow guide member toward said one of the outer and inner walls of the annular bypass duct.

3. The gas turbine engine as defined in claim 2 wherein the plurality of heat transfer members are spaced apart one from another and radially extending between the airfoil shaped flow guide member and said one of the outer and inner walls of the annular bypass duct.

4. The gas turbine engine as defined in claim 2 wherein the airfoil shaped flow guide member in an axial cross-section comprises a convex outer surface for guiding a main portion of the air stream to pass over the surface cooler, and an inner surface for guiding a secondary portion of the air stream to pass through the plurality of heat transfer members.

5. The gas turbine engine as defined in claim 2 wherein the airfoil shaped flow guide member comprises a leading edge section located upstream of the plurality of heat transfer members, the leading edge section having a concave inner surface in an axial cross-section thereof for diffusing a secondary portion of the air stream to pass through the plurality of heat transfer members.

6. The gas turbine engine as defined in claim 1 wherein the airfoil shaped flow guide member comprises a trailing edge section located downstream of the plurality of heat transfer members to control mixing of a main portion of the air stream passing over the surface cooler with a secondary portion of the air stream exiting from an air channel formed between the airfoil shaped flow guide member and said one of the outer and inner walls.

7. A gas turbine engine comprising an annular bypass duct defined radially between an outer wall and an inner wall around a core engine, and a surface cooler disposed within the bypass duct and supported on one of the outer and inner walls, the surface cooler including a cooler member defining a fluid passage for a fluid flow to pass therethrough, a plurality of heat transfer members spaced apart one from another and radially projecting from the cooler member, and an airfoil shaped flow guide member having a leading edge and a trailing edge with respect to an air stream axially passing through the bypass duct, the cooler member being directly connected to the airfoil shaped flow guide member, the plurality of heat transfer members being located radially between the airfoil shaped flow guide member and said one of the outer and inner walls.

8. The gas turbine engine as defined in claim 7 wherein the plurality of heat transfer members are connected to both the cooler member and the airfoil shaped flow guide member.

9. The gas turbine engine as defined in claim 7 wherein the fluid passage is at least partially embedded in the airfoil shaped flow guide member.

10. The gas turbine engine as defined in claim 7 wherein the plurality of heat transfer members are supported on and in direct contact with said one of the outer and inner walls.

11. The gas turbine engine as defined in claim 7 wherein the plurality of heat transfer members are supported by a support member in radially spaced apart relation to said one of the outer and inner walls.

12. The gas turbine engine as defined in claim 7 wherein the surface cooler is annular.

13. The gas turbine engine as defined in claim 7 wherein the surface cooler is a circumferential section of an annular profile.

14. The gas turbine engine as defined in claim 7 wherein the airfoil shaped flow guide member in an axial cross-section comprises a convex outer surface for guiding a main portion of the air stream to pass over the surface cooler, and an inner surface for guiding a secondary portion of the air stream to pass through the plurality of heat transfer members.

15. The gas turbine engine as defined in claim 14 wherein the airfoil shaped flow guide member comprises a trailing edge section located downstream of the plurality of heat transfer members to control mixing of the main portion and secondary portion of the air stream.

16. The gas turbine engine as defined in claim 7 wherein the airfoil shaped flow guide member comprises a leading edge section located upstream of the plurality of heat transfer members, the leading edge section having a concave inner surface in an axial cross-section thereof for diffusing a secondary portion of the air stream to pass through the spaced apart plurality of heat transfer members.

* * * * *